United States Patent
Manilla et al.

[15] 3,678,567
[45] July 25, 1972

[54] PRODUCTION OF CLAD METAL ARTICLES

[72] Inventors: Charles E. Manilla; Harold H. Honaker, both of Huntington; David O. Gothard, Ona, all of W. Va.

[73] Assignee: The International Nickel Company, Inc., New York, N.Y.

[22] Filed: June 18, 1970

[21] Appl. No.: 57,896

Related U.S. Application Data

[60] Division of Ser. No. 630,987, Apr. 14, 1967.

[52] U.S. Cl. .................29/420.5, 29/191.2, 29/192 R, 29/473.3, 29/474.3, 29/DIG. 47
[51] Int. Cl. .........................................B22f 3/24
[58] Field of Search............29/473.3, 474.3, 420.5, DIG. 47, 29/191.2, 192 R

[56] References Cited

UNITED STATES PATENTS

| | | | |
|---|---|---|---|
| 873,746 | 12/1907 | Haynes | 75/171 A |
| 3,066,403 | 12/1962 | Brauchler | 29/420.5 |
| 3,159,482 | 12/1964 | Eudier | 29/420.5 X |
| 3,231,971 | 2/1966 | McFarland et al. | 29/196.6 X |
| 3,282,660 | 11/1966 | Pendleton et al. | 29/473.3 X |
| 3,447,230 | 6/1969 | Bargainnier et al. | 29/420.5 |
| 3,449,821 | 6/1969 | Vansteenkiste | 29/474.3 |

*Primary Examiner*—John F. Campbell
*Assistant Examiner*—Donald C. Reiley, III
*Attorney*—Maurice L. Pinel

[57] ABSTRACT

Production of clad stock, e.g., bar, tubing, pipe, etc., wherein the cladding is prepared by pressing metal powders to desired form, the green form is sintered and coextruded hot with the core or basis material. Highly corrosion resistant cladding metals can be applied to core or basis materials of iron-group metals including common structural materials and high recovery of the cladding material is obtained. Clad tubes having a cladding of 50 percent nickel-50 percent chromium alloy on substrates of steels, nickel alloys, including nickel-chromium alloys, etc., can readily be produced for use in applications requiring resistance to severe corrosive conditions at various temperatures.

22 Claims, 6 Drawing Figures

PRODUCTION OF CLAD METAL ARTICLES

The present application is a division of our copending U.S. application Ser. No. 630,987 filed Apr. 14, 1967.

The art demonstrates a long history in relation to the production of composite products. For example, hot-dipped coatings of tin, zinc and lead are provided industrially on steel products in substantial tonnages each year. Other metal coating and/or cladding methods include electrodeposition, metal spray, cementation, wherein metals such as zirconium, chromium, aluminum and silicon are applied to steel; cladding processes, wherein a metal such as copper may be cast about or upon a steel core to form a composite ingot which is then worked down; welding processes, wherein corrosion resistant metal coatings such as stainless steels, nickel-chromium alloys and other alloys are applied to base material, such as carbon steel, hot rolling of sandwich-type slabs, etc. Even paint-coated metals may be considered as composite products.

The commercial acceptance of composite products has been great. One of the reasons for such acceptance of composite products is the fact that materials such as steels of various kinds which are strong and low in price are not sufficiently resistant to destructive media to provide an acceptable useful life in service unless a more corrosion resistant coating is applied to exposed faces thereof. Coated and/or cladded metal articles provide economic advantages in that materials which are relatively cheap and quite strong can be rendered satisfactory for use in environments which would be destructive thereto by applying to the surface thereof a coating or cladding of more corrosion resistant metal. In general, the coatings and/or claddings are made of materials which are more expensive than the basis material and the coating and/or cladding procedure enables the production of a relatively inexpensive composite article which will, nevertheless, have an acceptable service life in a medium which would be destructive to the basis metal. Generally, coatings and/or claddings are relatively thinner than the basis metal, thereby providing economy in the use of the generally more costly cladding and/or coating metal.

With advances in technology, the demand for improved service life of metallic materials in destructive media at room temperature and at elevated temperatures has increased. For example, in superheater tubes employed in boilers which are fired by coal or oil, it is found that highly corrosive conditions are generated from the products of combustion. Thus, many cheap fuels, such as residual oil, contain vanadium and sulfur and the combustion products of the fuel are extremely corrosive to ferrous and non-ferrous metals with the results that superheater tubes have a very short life. Replacement of the tubes requires shut down of expensive equipment with resulting high cost. This problem could be solved if a cladding resistant to extremely corrosive conditions could be applied to a cheaper alloy such as a stainless steel, nickel-chromium alloy, etc.

It is known that nickel-chromium alloys containing, for example, 40 percent or 50 percent or more chromium and the balance essentially nickel, offer exceptional resistance to hot atmospheres containing vanadium and sulfur compounds. However, large ingots made of such alloys are extremely difficult to hot work. Another constantly occurring demand in connection with clad metals is that they be provided in commercial forms at as low a price as possible.

One method of producing a clad tube, for example, is to insert a billet of a cheaper metal, for example, carbon steel, stainless steel or the like, within a tube of a more corrosion resistant metal, heat the assembly and hot work the same so as to provide a cladded tube. However, such processes involve two expensive hot tube-forming operations and complex auxiliary operations replete with substantial scrap losses and accordingly are not economically attractive.

It is known to produce cladded metal structures using powder metallurgy techniques. Generally, such techniques have been employed in the production of bearing elements in which powdered metals, such as lead, copper, or aluminum are sintered and metallurgically bonded to a metal substrate, such as steel and the like, using a combination of sintering and rolling steps to achieve densification. Such metals are generally easy to work with and do not require high processing temperatures.

However, corrosion-resistant chromium-containing alloys have not been generally amenable to such treatments. Such powder materials require higher working temperatures and a great deal of care must be taken to avoid oxidation which tends to interfere with sintering and with obtaining the desired metallurgical bond with the metal substrate.

Moreover, the characteristics of the cladding material may not always be compatible with the characteristics of the substrate or basis metal using conventional metal working techniques, whereby cracks may occur in the coating and render it substantially worthless as a protective coating.

In producing a self-supporting layer by pressing a powder mixture in a die prior to application to a metal substrate, it could not always be certain that a crack-free layer could be obtained because of the difficulty in achieving uniform density throughout the green layer by pressing. In addition, because the layer to be bonded was necessarily porous during the initial stages of hot working, it was not uncommon for the layer to rupture during consolidation while in contact with the metal substrate.

As far as we are aware, it has not been possible, prior to our invention, to produce economically a cladded metal product in which the clad is a high chromium alloy of the type containing, for example, approximately 50 percent chromium and approximately 50 percent nickel.

A demand accordingly exists in the art not only to provide cladded metals such as tubing, rods and the like at as low a price as possible but also to provide such products with metallurgically bonded claddings made of highly corrosion resistant alloys which are generally difficult to hot work from the usual ingot stage.

We have now discovered a method whereby composite products can be produced in a simple and relatively inexpensive manner with minimization of scrap losses in relation to the cladding material and which makes possible the production of claddings made of difficultly hot workable alloys.

It is an object of the present invention to provide by powder metallurgy means an improved process for making cladded metal articles.

It is another object of the present invention to provide claddings made of highly corrosion resistant metal upon basis metal having poorer corrosion resistance by a powder metallurgy method.

It is a further object of the invention to provide, by powder metallurgy, metallic composite tubes having an excellent metallurgical bond between the cladding metal and the basis metal.

A still further object is to provide a composite billet for producing a cladded metal product, in which the clad-forming element is a self-sustaining layer of compressed metal powder.

Other objects and advantages of the invention will become apparent from the following description taken in conjunction with the accompanying drawing in which.

Figure 1:
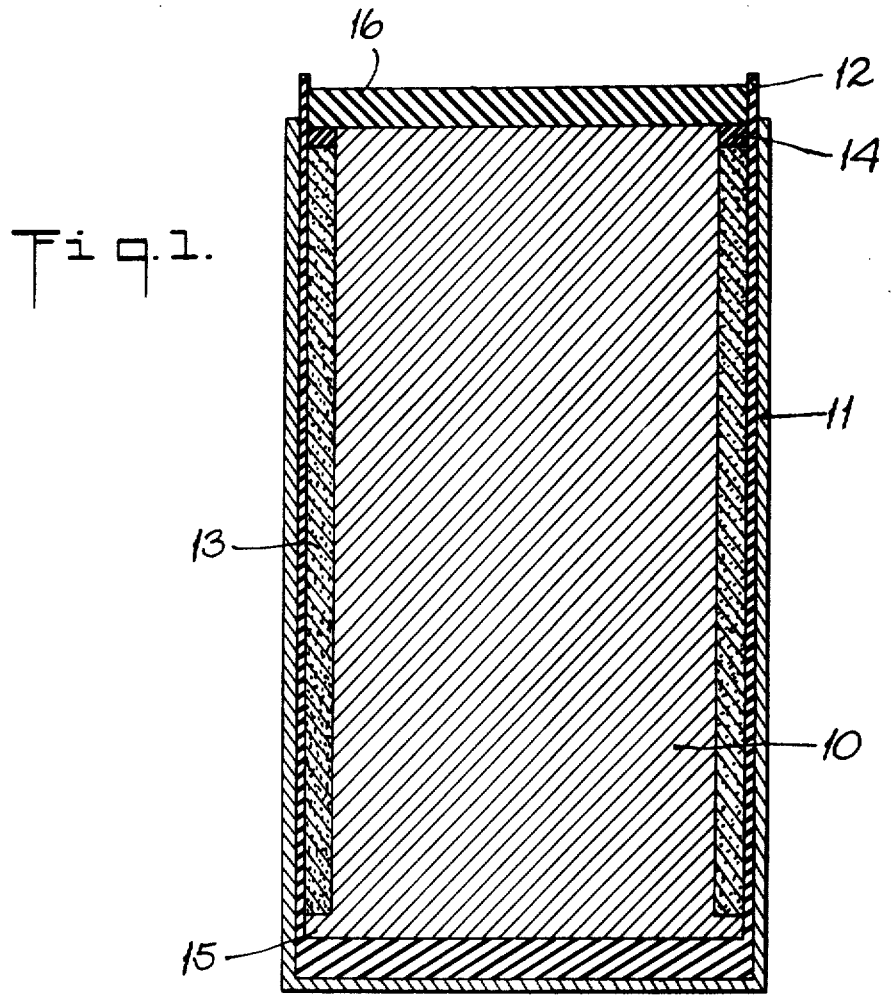
FIG. 1 is a schematic representation of a mold assembly for molding a tube from metal powder in accordance with the invention.

In its broad aspects, the present invention provides a powder metallurgy method for producing a wrought composite metal product comprising, providing a compacted self-supporting preform of uniform porosity from metal powders having a composition such that, when substantially fully densified, the melting point thereof is at least about 2,300°F., assembling the preform in contact with a basis metal shape made of metal having a melting point of at least about 2,300°F. and maintaining the preform and basis metal in their assembled relationship while hot coextruding the assembly through an extrusion die under protective conditions to produce a metallurgically bonded wrought composite metal product. The assembly may comprise a composite billet formed of a metal core fitted within a preform comprising a sintered uniformly porous shell of metal powder which when hot consolidated has a melting point of at least about 2,300°F. The core and conforming shell may have any desired cross-sectional configuration, for example, the cross section may be a circle, an ellipse, a square, a rectangle, and the like.

By extruding the billet under protective conditions, a cladded metal product of good metallurgical quality is assured. Such conditions may be achieved by extruding in vacuum, or under a controlled atmosphere substantially non-oxidizing to the billet, or by maintaining a protective layer between the product being extruded and the extrusion die, the latter method being advantageously preferred. Advantageously, the protective layer is a substantially non-decomposable inorganic material capable of flowing under heat and pressure along the surface of the extrusion die and of providing lubricity during extrusion.

The inorganic material may be in the form of a dense deformable metal coating covering the composite billet capable of flowing freely along the surface of the extrusion die during extrusion. The covering may be a jacket or can of nickel, iron, or deformable nickel-base or iron-base alloys. A method of protection found particularly advantageous during extrusion is to employ a deformable metal coating covering the billet together with a layer of inorganic high temperature lubricant in contacting relationship with and between the deformable metal layer and the die surface, the high temperature lubricant being characterized by the property of viscous flow during extrusion. Examples of siliceous high temperature lubricants which may be used advantageously are mineral wool, basalt, slags, glass, and the like.

In its more preferred aspect, the present invention comprises forming, as a preform, the hollow shell from metal powder by pressing said powder about a smooth former, removing the resulting preformed shell from the former, sintering the shell under conditions nonoxidizing to the metal of the shell, placing within said shell a metal core having an outer configuration substantially matching the inner configuration of said shell and hot extruding said core and said shell under protective conditions together to form a composite metal product. The step of forming the metal powder shell is highly important in relation to the purposes of the present invention. It is desirable that the shell have an internal surface of as high a quality as possible and have uniform porosity, that is, uniform density. This objective is most advantageously attained by isostatically pressing about a rigid former an initial powder mixture having a composition such that when hot consolidated the melting point thereof is at least about 2,300°F. The former employed may advantageously be made of polished metal such as steel, although other rigid metallic materials, plastic materials, glass, ceramics, etc., could be used. By this means, the inner face of the powder pressing conforms to the smooth face of the polished former and is accordingly of high quality with regard to smoothness and freedom from mechanical defects.

In addition, by isostatically pressing the powder, a shell of uniform porosity or density is assured which enables it to be sintered with a minimum tendency towards cracking.

The powder metallurgy shell or clad-forming element may be produced to have a composition selected from the group consisting of nickel, chromium, iron group-chromium alloys containing about 15 to 60 percent chromium, up to about 55 or 65 percent cobalt, with the balance essentially up to about 85% iron, up to about 85 percent nickel and mixtures thereof; and hot-workable nickel-base alloys containing less than 15 percent chromium, such as nickel-copper alloys containing about 10 to about 45 percent copper and the balance essentially nickel; nickel-molybdenum alloys containing up to about 40 percent molybdenum and the balance essentially nickel; nickel-aluminum alloys containing up to about 10 percent aluminum and the balance essentially nickel; and other hot-workable nickel-base alloys.

The powders which may be employed for producing the shell may be readily available commercial grades; for example, carbonyl nickel, iron and cobalt powders are eminently satisfactory. Electrolytic chromium likewise is satisfactory, although ferrochromium powders may be employed in interests of economy. Presently available ferrochromium powders tend to contain undesirably high amounts of foreign materials such as oxides, etc. Hydrogen-reduced mill scale may be employed as a source of iron powder. Hydrogen-reduced nickel, cobalt and copper powders may also be employed. In general, the initial powder mixture should be thoroughly blended and preferably and advantageously prepared from powders having particle sizes not exceeding about 100 mesh in the longest dimension. Care should be taken to prevent segregation of the blended powders. The powders found particularly advantageous are those having particle sizes in the range of about 1 to about 40 microns, since the necessary diffusion and alloying during sintering and extrusion are then facilitated. Alloyed and coated powders, e.g., nickel-coated chromium powders, may be employed to advantage. Advantageously, at least about 40 or about 50 percent, by weight, of the powder in the initial mixture is a readily compressible isostatically of irregular shape having a particle size not exceeding 10 microns, e.g., carbonyl nickel powder, etc. The presence of such quantities of such powders in the mixture helps to prevent segregation of the powders and contributes importantly to the green strength of shells produced by isostatic compression at ambient temperatures and at reasonable and economic pressures, e.g., pressures ranging up to about 50,000 pounds per square inch (p.s.i.). When more than about 40 percent of the powders are spherical in shape, undesirable segregation of powder mixtures occurs much more readily and the green strength of increase pressed shells suffers. Efforts to improve green strength of such powder mixtures through the use of pressing pressures exceeding 50,000 p.s.i., e.g., 100,000 p.s.i., or through the use of elevated temperatures greatly complicate the shell-forming operation, require the use of much more expensive equipment and are not uniformly successful. Such efforts also increase cost substantially.

The invention is particularly applicable to the production of extruded articles, e.g., tubes, having claddings made of nickel-chromium and nickel-chromium-iron alloys, e.g., alloys containing about 15 to about 60 percent chromium, e.g., about 20 or 30 percent to about 50 percent chromium, up to about 40 percent iron and the balance essentially nickel. Minor amounts, e.g., up to about 20 percent or about 25 percent, of other ingredients may be employed in these alloys as well as in the cladding metals described hereinbefore. Such other ingredients, e.g., up to about 5 percent manganese, up to about 12 or 15 percent columbium, up to about 15 or 20 percent molybdenum, up to about 10 or 15 percent tungsten, up to about 0.25 or 0.5 percent or even 1 percent carbon, up to about 2 or 3 percent silicon, up to about 0.5 percent magnesium, up to about 5 percent aluminum, up to about 5 percent titanium, up to about 1 or 2 percent zirconium, etc., can be included in the initial powder mixture for special purposes. Carbon acts as a deoxidizer and can contribute to carbide hardening. Preferably, silicon, magnesium, aluminum and titanium powders are coated with a metal such as nickel to minimize oxidation of these metals and/or interaction with other ingredients.

It is found that the chromium-containing metal powder mixtures can be isostatically pressed about a polished metal former and upon release of the pressure will spring back from the former thereby permitting easy removal of the green powder pressing from the former even though the former is made with parallel sides as in a cylinder. In the case of powder mixtures containing less than about 15 percent chromium, a slight draft is advantageously provided on the polished metal former to permit easy removal of the green powder shell therefrom since such powder mixtures, including chromium-free mixtures, do not exhibit the "spring back" phenomenon to as great an extent. With such powder mixtures straightness, smoothness and lack of ovality of the cylindrical former is much more important than in the case of chromium-containing powder mixtures.

The core material, which is assembled with the shell before extrusion, may be made of an iron-group metal or an alloy containing a major proportion of iron-group metal wherein the metal or alloy preferably, though not necessarily, has a melting point not exceeding that of iron and has a composition to satisfy the structural demands of the service contemplated for the final composite article. For purposes of economy, the core material may conveniently be a wrought, e.g., hot rolled, material such as a round. The exterior surface of the core material is conditioned to remove surface oxides and other imperfections thereon by methods such as sand blasting, machining, pickling and the like. It is not necessary that the exterior surface of the core be polished.

Examples of core metals which may be employed are those selected from the group consisting of iron; nickel; cobalt; low and medium alloy steels; and alloys containing about 5 to 30 percent chromium, up to about 30 percent cobalt and the balance essentially up to about 90 percent iron and up to about 85 percent nickel. The steels include carbon steels and high strength low and medium alloy steels, stainless steels containing about 5 to about 30 percent chromium, up to about 30 percent nickel and the balance essentially iron; and in addition nickel, and nickel alloys, such as nickel-chromium and nickel-chromium-iron alloys containing about 5 to about 30 percent chromium, up to about 50 percent iron and the balance essentially nickel, e.g., an alloy containing about 30 percent to about 35 percent nickel, about 19 percent to about 23 percent chromium, and the balance essentially iron and the like. Age hardenable and dispersion-hardened grades of nickel, nickel-chromium and nickel-chromium-iron alloys can be employed as core materials. Maraging steels may also be employed. An essential characteristic of the core material is that it be readily bondable to the shell material under the temperature and pressure conditions employed in the extrusion operation.

It is to be appreciated that the core material can be inserted in the powder shell either before or after the sintering operation. Most green powder mixtures will shrink during sintering and accordingly dimensional provision is made between the outer dimensions of the core and the inner dimensions of the green shell to permit shrinkage to take place without cracking of the shell during sintering. It is advantageous to insert the core material within the shell when the shell is in the green, i.e., unsintered, condition since the core material then provides some mechanical support for the shell during the sintering operation. Sintering is conducted in an atmosphere which is nonoxidizing to the shell material and at an elevated temperature, e.g., 1,800° to 2,400°F., having regard for the temperature requirements for sintering the shell. Some bonding of the shell material to the core material may, and advantageously does, take place during the sintering operation. It is, however, not essential to extrusion that bonding between the core and the shell be accomplished during the sintering. Sintering is desirably conducted to such an extent that the sintered shell has sufficient strength to be self-supporting and readily handled and to accomplish substantial diffusion and/or alloying in the sintered shell.

In preparing the composite material for extrusion, it is advantageously convenient to encase the core and shell assembly within a deformable supplemental metal can, or jacket, or coating which may be commercially pure nickel, steel, etc., applied by welding sheet material, by dipping in molten metal, e.g., nickel, or by sintering a metal powder coating applied as a slurry. A slurry comprising fine metal powder, e.g., carbonyl nickel powder, dispersed in a liquid medium, e.g., an organic medium containing a binder, applied about the exterior of the sintered shell assembled on the core may also be employed for protective purposes. At this point, sintered shells made from initial powder mixtures containing 15 percent or more chromium are not fully dense, being in excess of 70 percent and generally in excess of 80 percent of theoretical density. The supplemental canning or coating procedure to apply a substantially dense deformable metal layer about the shell protects it against oxidation during heating in mill furnaces prior to extrusion, while providing lubricity by flowing freely under heat and pressure during extrusion. If a steel or iron supplementary coating is employed, heating for extrusion is conveniently accomplished under conditions which are essentially non-scaling to steel, e.g., in a salt bath furnace.

An advantageous and relatively inexpensive procedure for coating sintered shells made of chromium-containing metal involves coating the shell with a slurry containing fine nickel powder, e.g., carbonyl nickel powder having a particle size not exceeding about 10 microns, a volatilizable vehicle and a vehicle-soluble or dispersible binder. The vehicle preferably is a volatile organic liquid such as kerosene, methyl methacrylate, etc. The slurry may contain, by weight, about 50 to about 80 percent of fine nickel powder, up to about 5 percent, e.g., about 0.1 to about 5 percent, of a binder, with the remainder being the vehicle. An organic system comprising methyl methacrylate with an acrylic resin ("Lucite") as a binder is satisfactory. The consistency of the slurry is adjusted to the method of application, e.g., spraying, brushing, dipping, etc., by adjusting the contents of nickel powder and/or binder. After application of the slurry to the sintered shell, it is dried and sintered in a protective atmosphere, e.g., dry hydrogen, at a temperature sufficiently high, e.g., at least about 2,000°F. and, more advantageously, about 2,200°F. to sinter the nickel coating to substantially full density. Fine iron powder, e.g., carbonyl iron powder, may be employed along with or in place of fine nickel powder in the slurry. These procedures afford some protection against oxidation of the metals during heating for extrusion and, hence, are advantageous in the case of sintered shells containing chromium. The supplemental coating material also affords a lubricating effect during extrusion and subsequent working operations. As stated hereinbefore, the coating material may be selected from the group consisting of nickel, iron, and deformable nickel-base and iron-base alloys. In addition to the supplemental coating, it is advantageous to employ a high temperature lubricant, to further enhance lubricity during extrusion.

The coated assembly is then heated to the temperature required for extrusion, usually at least about 2,000°F. In the case of a shell comprising 50 percent nickel and 50 percent chromium, having a core made of an alloy containing about 32 percent nickel, about 20 percent chromium, and the balance essentially iron, a heating temperature of about 2,200° to about 2,350°F. for extrusion is satisfactory. The heated assembly is then extruded to tubing in a conventional extrusion press.

During extrusion, metallurgical bonding of the shell material to the core material is completed or accomplished and the shell material is compacted to substantially 100 percent density. Advantageously, an extrusion ratio of about 10 to 1 to about 25 to 1 is employed. It is in the extrusion operation that the nature of the metals selected for use in the core and in the shell become of particular importance. Thus, the metals in each portion of the composite material being extruded are selected to have melting points, in the fully alloyed condition, of at least about 2,300°F., e.g., at least about 2,350°F., and preferably not exceeding the melting point of iron, i.e., about 2,800°F., and more preferably not exceeding about 2,650°F. or even about 2,460°F. (1,350°C.). This special control, especially for a cladding alloy comprising about 40 to 60 percent chromium and the balance essentially nickel, contemplated in accordance with the invention facilitates final compaction of shell material and bonding of the shell and core materials in the extrusion operation. The so-controlled shell and core materials extrude at similar rates and substantially uniform thickness of cladding is accomplished. It appears that bonding of the core and cladding materials is accomplished to a substantial extent during the upsetting of the composite extrusion billet in the extrusion chambers prior to the time that metal is actually forced through the die. Such bonding enables coextrusion of both materials having controlled melting points and prevents stripping away of the cladding from the core during extrusion. In addition, the aforementioned special control insures that extrusion will be conducted at a temperature substantially exceeding the recrystallization temperature of each material, a factor which further facilitates bonding during extrusion. The special melting point control also assures that each portion of the composite will have similar hot working and cold working characteristics.

With respect to a cladding alloy containing about 15 to 60 percent chromium and the balance essentially nickel, and particularly one containing about 35 to about 65 percent chromium, e.g., about 40 to about 60 percent chromium, it will be noted according to the nickel-chromium binary diagram that alloys over such ranges of composition have a lowest melting phase (a eutectic) which melts in the neighborhood of about 1,345°C. With alloys of the foregoing composition, the extrusion temperature should be at least about 85 percent of the absolute melting point of the lowest melting phase and, more advantageously, from about 90 to 97 percent of the absolute melting point of the lowest melting phase.

The extruded tube may then be further reduced by conventional hot and/or cold forming methods such as hot or cold drawing, tube reduction, swaging and the like, to provide dimensions required for specific uses. Advantageously, the extruded material is annealed before further processing. The thickness of the cladding in the final tubing is, of course, controlled by the thickness of the initial shell and the proportion of said thickness to the transverse dimension of the core material. Claddings on the order of 10 to 50 percent of the final thickness, e.g., wall thickness of a tube, of the extrusion can readily be provided.

In forming the shell from metal powders, isostatic pressing at ambient temperatures is advantageously employed to insure uniform shell density. This method readily affords a means for producing a self-supporting green powder shell having sufficient strength to permit handling (e.g., an apparent density of at least about 60 percent) at readily attainable pressures, for example, about 10,000 p.s.i. to about 40,000 p.s.i., e.g., about 30,000 p.s.i., when a substantial proportion of a fine readily compressible powder is employed in the powder mixture. The accompanying FIG. 1 illustrates a mold assembly for pressing the powder shell. In FIG. 1, reference character 10 illustrates the smooth central core about which the powder mixture is to be pressed. This core may be made of steel or any other convenient strong metal and it advantageously is polished so as to provide a smooth interior surface on the powder pressing. The assembly includes a metal container 11 which is placed about the entire assembly and a bag 12 made of a plastic or elastomeric material such as rubber fitting within the container 11 and completely surrounding the core 10 and providing an annular space therebetween. Metal powder is packed in the annular space between bag 12 and former 10 as designated at 13. Rubber spacer 14 is inserted at the upper portion and metal flange 15 is provided at the bottom of the annularly packed powder to maintain flat surfaces and square corners on the powder during the compacting step and a rubber sealing disc 16 is employed to close the annular space at the top of bag 12. The mold assembly as shown in FIG. 1 is subjected to hydrostatic pressure to compress the powder and to form the green shell.

Composite metal products which may be produced in accordance with the present invention include those set forth in Table I.

TABLE I

| Combination No. | Shell Material | Core Material |
|---|---|---|
| 1 | 50% nickel-50% chromium | 32% nickel, 20.5% chromium, balance iron |
| 2 | 50% nickel-50% chromium | stainless steel |
| 3 | 60% nickel-40% chromium | 32% nickel, 20.5% chromium, balance iron |
| 4 | 80% nickel-20% chromium | steel |
| 5 | stainless steel | steel |
| 6 | nickel | stainless steel |
| 7 | nickel | steel |
| 8 | 50% nickel-50% chromium | steel |
| 9 | 50% nickel-50% chromium | 15% chromium, 7% iron, balance nickel |
| 10 | 15% chromium, 7% iron, balance nickel | steel |
| 11 | 70% nickel-30% copper | steel |
| 12 | 32% nickel, 20.5% chromium, balance iron | steel |
| 13 | 60% chromium-40% nickel | 15% chromium, 7% iron, balance nickel |
| 14 | 60% chromium-40% nickel | steel |

It is also possible to produce the core material by powder metallurgy methods involving pressing and sintering of powders having, or which are blended to have, the desired composition. The core material may be produced as a casting, for example, by the methods described in U.S. Pat. Nos. 2,882,568 and 2,973,563.

In order to give those skilled in the art a better understanding and/or appreciation of the advantages of the invention, the following illustrative examples are given:

EXAMPLE I

Figure 3:
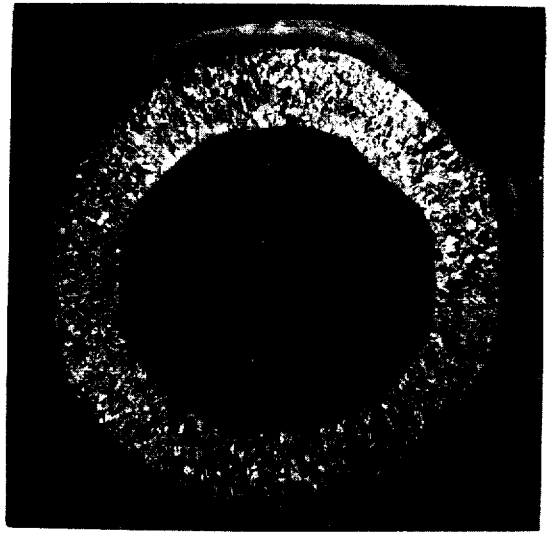
FIG. 3 is a reproduction of a photograph taken at 1.85 diameters depicting the etched surface of a cross section of a clad tube which had been pointed for cold drawing.
Figure 2:
FIG. 2 is a reproduction of a photograph taken at 0.167 diameter showing the surface of clad tubes produced in accordance with the invention.
Figure 4:
FIG. 4 is a reproduction of a photograph taken at 0.74 diameter depicting the pointed end of a cold drawn clad tube.

A powder mixture comprising about 50 percent, by weight, of carbonyl nickel powder having a particle size of about 5 microns and about 50 percent, by weight, of minus 325 mesh electrolytic chromium powder was thoroughly blended. The powder was isostatically pressed at a pressure of about 30,000 p.s.i. about a smooth metal former using a mold assembly as illustrated in the accompanying FIG. 1. When the mold was disassembled, it was found surprisingly that the green pressed nickel-chromium shell displayed sufficient spring-back to permit easy removal of the green shell from the former. The pressed shell was in the form of a hollow cylinder having a diameter of about 8½ inches, a wall thickness of about 0.625 inch, a length of about 30 inches, and was self-supporting and had sufficient green strength to permit handling. A hot rolled extrusion billet made of an alloy containing about 32 percent nickel, about 20.5 percent chromium, and the balance essentially iron was placed within the green shell. The billet had an outside diameter of about 7.150 inches, a length of about 29 inches, and was provided with an axial hole of about 2.25 inches in diameter along the length thereof. The outer surface of the extrusion billet was prepared by rough turning. The assembly was then heated at about 2,300°F. in a hydrogen atmosphere for about 12 hours to sinter the shell. During the sintering operation, interdiffusion occurred between the nickel and chromium particles in the shell, the shell shrank, and some bonding occurred between the shell and the core. The sintered shell was about 80 percent dense. The assembly including the sintered shell was cooled in hydrogen, was enclosed in a welded can made of commercial wrought nickel sheet about 0.187 inch thick, was heated to about 2,300°F. for about 4 hours in a natural gas-fired heating furnace, and was extruded with glass lubrication to a tube having an outside diameter of about 2.75 inches, a wall thickness of about 0.437 inch and a length of about 35 feet. The nickel-chromium alloy cladding was about 25 percent of the wall thickness. When the extruded tube was examined no cracks or tears were noted in the cladding and the cladding thickness was uniform from the front to the back of the tube. The tube was annealed for 1½ hours at 2,250°F. and was water quenched. The annealed tube was pointed, and was cold drawn without difficulty. It was found that the annealed cladding material had a hardness of about 92 Rockwell "B", although a cast alloy of the same nominal composition had a hardness of 23 Rockwell "C" after extrusion and a similar anneal. Metallurgical examination of the extruded and the cold drawn material demonstrated that the nickel-chromium alloy cladding was substantially completely densified, although some oxide inclusions apparently derived from oxides present in the initial chromium powder were noted in the structure. The dense cladding was metallurgically bonded to the core material. No checking of the coating was observed at the cold drawn stage after removal of the nickel can material as is illustrated in the accompanying FIG. 2. The severe deformation induced by the tube pointing operation did not cause any separation of the bond between the cladding and core metals as is illustrated by the accompanying FIG. 3, which shows the structure of the transverse section of the tube in the pointed area. The outer surface of a portion of the tube, including the pointed area, is shown in FIG. 4. This example demonstrates that by proceeding in accordance with the invention, a final wrought material having cladding containing 50 percent nickel and 50 percent chromium may readily be produced. This cladding material is difficultly hot workable by presently existing means when starting from a large cast ingot. The nickel-chromium-iron alloy was selected as the core metal in this Example since it is characterized by good structural stability upon long-time exposure at temperatures on the order of 900°F. to 1,500°F. and performs well in contact with superheated steam inside superheater tubing. The 50 percent nickel-50 percent chromium cladding is practically immune to elevated temperature corrosion in the presence of vanadium and sulfur compounds as is encountered on the outside face of superheater tubing. The clad tube accordingly is capable of almost indefinite life in superheaters fired with low-grade fuels such as coal, residual oil, etc.

EXAMPLE II

An extruded tubing having cladding representing about 25 percent of the wall thickness made of a 18 percent chromium-8 percent nickel stainless steel on a mild steel core is produced in accordance with the procedures set forth in Example I employing an initial powder mixture comprising about 18 percent, by weigh, of electrolytic chromium powder, about 8 percent, by weight, of carbonyl nickel powder, and the balance iron powder derived from reduced mill scale to provide the initial shell and employing a hot rolled mild steel core material with the oxide surface removed by pickling. It was found that the stainless steel powder shell sprang back from the former after the isostatic pressing operation.

EXAMPLE III

Carbonyl nickel powder having a particle size not exceeding about 5 microns is isostatically pressed to form a shell about 9 inches in outside diameter and having a wall thickness of about 0.750 inch. The former employed is cylindrical with a draft of about 0.1 inch from end to end. The nickel shell is removed from the former, is assembled upon a rough turned hot rolled mild steel core having an axial hole 2.25 inches in diameter therethrough, is sintered in a sulfur-free atmosphere reducing to steel at about 2,200°F. for about 10 hours, and is then extruded directly to form a nickel clad steel tube having an outside diameter of about 2.875 inches and a wall thickness of about 0.437 inch with a nickel cladding representing about 25 percent of the wall thickness.

It is to be appreciated that the procedure made possible in accordance with the present invention not only facilitates the production of extruded composite materials having a cladding made of an alloy which is difficult to hot work but also facilitates the production of composite extruded articles made of readily workable materials with substantial economy. For example, in the production of stainless-clad mild steel tubing wherein a steel round is placed within a stainless steel tube and extruded therewith, it would normally be necessary to produce the stainless steel tube by conventional extrusion or piercing means. Substantial losses of metal are encountered in conventional processing from ingot to tubing form. Thus, losses of metal are encountered at the ingot stage and at each intermediate stage down to the tubing. Furthermore, it is frequently necessary to provide overhauling of the interior face of the stainless steel tubing in order to provide a sound metallurgical bond to the core material. Surface overhaul of the interior face of a tube is expensive in terms of machine and labor costs and losses of metal. The procedure afforded in accordance with the present invention enables very high recovery of cladding metal in terms of weight of finished cladding material on the finished tube as compared to the initial weight of the powders employed to produce the initial shell. This important commercial advantage enables a reduction in cost of extruded clad materials as compared to other methods now available.

The method of isostatically pressing powders about a smooth former as described hereinbefore is particularly advantageous in carrying out the invention and solves many practical problems. Thus, if the powders are gravity packed or are isostatically pressed directly about the core, shrinkage cracking of the powder material during sintering is almost inevitable. Furthermore, efforts to control shrinkage by using coarser powders, i.e., powders exceeding 100 mesh in size, and by controlling particle size distribution are of little avail since the required interdiffusion during sintering is then undesirably inhibited. In addition, any requirement for controlled powder particle size or distribution severely limits the choice of powders amongst the few grades which are commercially available and would necessitate the production of special powders at high cost. The initial shell could be produced by packing the powder mixture in a double walled mold made of rubber or other plastic or elastomeric material having a core inserted therein during the packing operation, removing the core, and hydrostatically pressing the mold from both sides. However, this method complicates the operation and usually does not provide as satisfactory an interior surface on the shell. Again, the shell could be pressed against a mold placed about the exterior thereof, with a rubber mold against the shell inner face. This procedure also requires a core during the mold filling step and introduces processing difficulties.

It is to be appreciated that multiple claddings can be provided in accordance with the invention by nesting together two or more sintered and/or pressed shells with an inner core and hot extruding the assembly.

Figure 6:
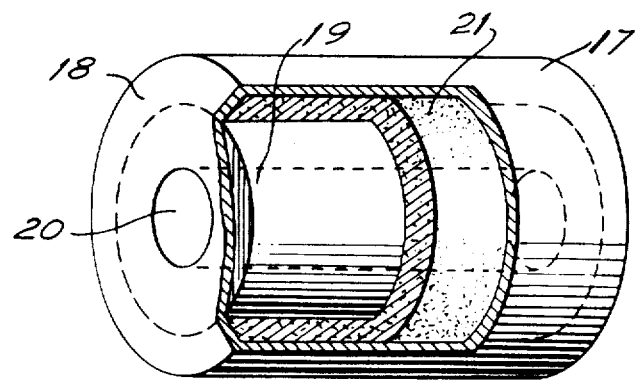
FIG. 6, which is partially broken away, is illustrative of a composite billet produced in accordance with the invention.

As illustrative of one embodiment of the composite extrusion billet provided by the invention, reference is made to FIG. 6 which shows, partially broken away, a can 17 fabricated, for example, from nickel sheet, having a cover 18 welded thereto, the can having confined within it a metal core 19 of, for example, a nickel-chromium-iron alloy containing approximately 20 percent chromium, approximately 32 percent nickel and the balance essentially iron. The core is shown having a hole 20 passing axially through it, the core being fitted snugly within a hollow porous shell 21 of sintered cladding metal of, for example, a nickel-chromium alloy containing approximately 50 percent chromium and the balance essentially nickel.

As previously noted, oxide inclusions flowing from oxides present in the initial chromium powder were found in the 50 percent nickel-50 percent chromium alloy cladding produced as described in Example I. These inclusions can be removed, with improvement in ductility and density of the cladding by employing the procedure described in U.S. application Ser.

No. 594,012, filed Nov. 14, 1966, in the name of H.H. Honaker and J.C. Judd, in which small additions of carbon and of a spacing agent such as ammonium chloride are employed in the initial powder mixture whereby chromium oxide is reduced during sintering in hydrogen.

Figure 5:
FIG. 5 is a reproduction of a photomicrograph taken at 1,000 diameters depicting the microstructure of a 50 percent nickel-50 percent chromium alloy cladding.

A special feature of the invention as applied to composite extruded products having a cladding of a 50 percent nickel-50 percent chromium alloy on a base made of steel, nickel, nickel-chromium alloys, stainless steel, etc., is that the product can be bent to shape and can be cold worked. Annealing of the extruded product at a temperature on the order of 2,200°F., preferably in a hydrogen atmosphere, is desirable before cold working, although the extruded product can be cold drawn without annealing. Thus, a slice from an extruded tube having a cladding of 50 percent nickel-50 percent chromium alloy on a base of a 32 percent nickel, 20 percent chromium, balance iron alloy which had been annealed at 2,200°F. for one hour and subjected to two consecutive cold drawing operations involving 9 percent reductions in each pass was subjected to cold rolling. The slice was cold rolled to reduce the thickness thereof 48 percent with little edge cracking. When annealed at 2,200°F. for one hour in hydrogen and cooled in hydrogen, the slice could be bent about a one inch diameter pin without fracture. The cladding and the base metal each was reduced proportionally in terms of the original thickness thereof. In contrast to this result, it appears that conventionally produced 50 percent nickel-50 percent chromium alloy is extremely difficult to cold work and it is not available commercially at the present time in cold worked mill forms. It appears that the fine microstructure which characterizes alloys containing about 40 percent to about 60 percent chromium, with the balance essentially nickel when produced as a cladding material contributes importantly to the working qualities thereof. This structure is depicted in FIG. 5 which shows the as-extruded structure of a 50 percent nickel-50 percent chromium alloy cladding on an extruded tube produced in accordance with the procedure described in Example I. The darker etching constituent is believed to be alpha phase.

While the invention has been described hereinbefore principally in connection with the production of clad tubing, it is to be appreciated that composite clad mill forms including sheet and strip can also be produced. In the production of flat mill forms, it is still advantageous to prepare an extrusion billet as described hereinbefore and to hot extrude the billet to a rectangular form. The extruded section can then be cut in lengths and cross-rolled hot to sheet or can be hot rolled to strip. The hot extrusion step is necessary to accomplish compaction and bonding of clad material comprising about 40 percent to about 60 percent chromium, e.g., about 50 percent chromium, with the balance essentially nickel. Single clad flat mill forms can be prepared by extruding a composite billet in which the powder shell is split longitudinally to cover one half of the surface of a cylindrical basis metal billet while the remainder of the billet surface is covered with a longitudinally split shell of matching dimension made of metal having a composition the same as or different from the basis metal billet. In this case, care is taken to place the composite billet in the extrusion press such that the cladding metal will be located on one surface of the extruded rectangular section form. The production of extruded rectangular shapes is facilitated by using a rectangular shaped billet, using a rectangular extrusion press container, by making both the cladding metal preform portion and the basis metal portion of the composite billet from metal powders, and by maintaining the cladding metal preform portion in contact with the composite powder billet during extrusion.

As is apparent, the invention provides a method for producing wrought composite metal products from a wide range of cladding metals, including metals normally difficult to produce by conventional cladding techniques. In its preferred aspects the invention comprises forming an isostatically pressed self-supporting preform of uniform porosity from metal powders having a composition such that, when hot consolidated, the melting point thereof is at least about 2,300°F., sintering the shape in a nonoxidizing atmosphere, assembling the shape in faying relationship with a basis metal shape having a composition with a melting point of at least about 2,300°F., and then maintaining the shapes in faying relationship while hot coextruding said shapes through an extrusion die to produce a metallurgically bonded metal article.

In protecting the metal powder shape while in faying relationship with the basis metal during extrusion, it is advantageous to employ an inorganic material such as an easily deformable metal layer against the compacted metal powder layer, capable of flowing under heat and pressure along the surface of the extrusion die. Preferably, the protection may comprise a plural layer structure formed of a protective deformable metal layer, e.g., nickel or iron, or the like, covering the compacted metal powder layer with a layer of inorganic material in contacting relationship with and between the deformable metal layer and the die surface capable of viscous flow along the die surface, whereby to provide additional lubricity during extrusion to ensure production of a metal cladding of good metallurgical quality.

The invention also provides a composite extrusion billet comprising a basis metal of melting point at least about 2,300°F., a consolidated self-supporting uniformly porous preform of metal held in faying relationship to the surface of the basis metal, the composition of the metal being such as to have a melting point of at least about 2,300°F. and advantageously a protective metal coating covering the assembly, the metal coating being capable of flowing under heat and pressure and providing lubricity during extrusion. In one embodiment of the invention, the basis metal may be a metal core and the compacted uniformly porous preform may be a sintered hollow shell fitted over the metal core, the assembled core and shell being in turn covered by a protective deformable metal coating, such as nickel, iron, and the like.

Cladded extruded products produced in accordance with the invention have a multiplicity of uses wherein articles having corrosion resistant surfaces upon basis metals having structural strength and utility are required. Thus, power plant tubing is an area of immediate interest since a composite tubing having a surface made of an alloy containing about 40 percent to about 60 percent chromium, e.g., about 50 percent chromium, with the balance essentially nickel and a basis of a nickel-chromium or nickel-chromium-iron structural alloy is useful in superheater tubing and a composite tubing having a chromium-nickel alloy surface and a structural steel base is useful in "cold wall" power plant applications. Cladded materials are also useful in chemical equipment handling corrosive materials. Thus, heating coils, evaporators, autoclaves and other reactors, etc., can be constructed in whole or in part of materials provided in accordance with the invention. Cladded articles provided in accordance with the invention can be welded using conventional welding techniques using filler materials matching the composition of each alloy component of the article. Thus, welds have been made in a cladding of 50 percent nickel-50 percent chromium alloy using the inert-gas shielded tungsten-arc procedure with matching composition filler metal.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

We claim:

1. A powder metallurgy method for producing a wrought composite metal product which comprises, providing a compacted self-supporting preform of uniform porosity from metal powders having a composition such that, when substantially fully densified, the melting point thereof is at least about 2,300°F., assembling said preform in contact with a basis metal shape made of metal having a melting point of at least about 2,300°F. and maintaining said preform and basis metal in said assembled relationship while hot coextruding them together through an extrusion die under protective conditions to produce a metallurgically bonded wrought composite metal product.

2. The method according to claim 1, wherein said powder metal preform is sintered prior to being assembled with said basis metal.

3. The method according to claim 1, wherein the compacted self-supporting preform of uniform porosity is formed by isostatically pressing metal powder selected from the group consisting of nickel; chromium; hot workable nickel-base alloys containing less than 15 percent chromium; and hot workable iron group-chromium alloys containing about 15 percent to 60 percent chromium, up to about 65 percent cobalt, with the balance essentially up to about 85 percent iron, up to about 85 percent nickel and mixtures thereof.

4. The method according to claim 3, wherein the isostatically pressed self-supporting preform has a composition comprising about 15 to 60 percent chromium and the balance essentially nickel, and wherein the extrusion temperature is at least about 85 percent of the absolute melting point of the lowest melting phase of the material forming said isostatically pressed self-supporting preform and below the melting point of the basis metal.

5. The method according to claim 3, wherein the basis metal shape has a composition selected from the group consisting of iron; nickel; cobalt; low and medium alloy steels; and an alloy containing about 5 to 30 percent chromium, up to about 30 percent cobalt, and the balance essentially up to about 90 percent iron and up to about 85 percent nickel.

6. The method according to claim 4, wherein the extrusion temperature ranges from about 90 to 97 percent of the absolute melting point of the lowest melting phase of the material forming said self-supporting preform.

7. The method according to claim 5, wherein the assembly is covered with a protective deformable metal coating prior to extrusion capable of flowing under heat and pressure and providing lubricity during extrusion.

8. A powder metallurgy method of producing a cladded metal product which comprises, providing a composite billet formed of a metal core of melting point at least about 2,300°F. fitted within a preform comprising a sintered uniformly porous shell of metal powder which when hot consolidated has a melting point of at least about 2,300°F. and then hot extruding said composite billet under protective conditions through an extrusion die to form a metallurgically bonded composite metal product.

9. A powder metallurgy method for producing a wrought composite metal product which comprises, forming a preform of a self-supporting uniformly porous shell from metal powders having a composition such that, when hot consolidated, the melting point thereof is at least about 2,300°F. by pressing said powder about a smooth former, placing within said preformed shell a metal core made of metal having a melting point of at least about 2,300°F., said core having an external configuration substantially matching the internal configuration of said shell, and hot extruding said core and said preformed shell together as a composite billet under protective conditions through an extrusion die to form a wrought composite metal product.

10. The method according to claim 9, wherein the uniformly porous shell is formed by isostatically pressing a metal powder selected from the group consisting of nickel; chromium; hot workable nickel-base alloys containing less than 15 percent chromium; and hot workable iron group-chromium alloys containing about 15 to 60 percent chromium, up to about 65 percent cobalt, with the balance essentially up to about 85 percent iron, up to about 85 percent nickel and mixtures thereof.

11. The method according to claim 9, wherein said metal powder is a mixture containing about 15 to 60 percent chromium, up to about 65 percent cobalt, with the balance of said mixture being essentially up to about 85 percent iron, up to about 85 percent nickel, the shell formed from the metal powder mixture being characterized by spring-back from said former when the shell is formed by isostatic compression of the powder thereagainst.

12. The method according to claim 11, wherein the uniformly porous shell is a mixture of metal powder containing about 15 to 60 percent chromium, and the balance essentially nickel.

13. The method according to claim 12, wherein the chromium content of the shell ranges from about 40 to 60 percent.

14. The method according to claim 9, wherein a substantially non-decomposable inorganic material is employed during extrusion capable of flowing under heat and pressure along the surface of the extrusion die to provide protection at the surface of the billet as well as lubricity during extrusion.

15. The method according to claim 14, wherein the inorganic material protecting the composite billet is a deformable metal jacket encasing said billet, said metal being selected from the group consisting of nickel, iron, and nickel-base and iron-base alloys capable of flowing freely under heat and pressure and provide lubricity during extrusion.

16. The method according to claim 14, wherein the inorganic material is formed of a protective deformable metal layer covering the porous shell and a layer of a high temperature lubricant in contacting relationship with and between the deformable metal layer and the die surface, the high temperature lubricant being characterized by viscous flow during extrusion.

17. The method according to claim 9, wherein the core metal is selected from the group consisting of iron; nickel; cobalt; low and medium alloy steels; and an alloy containing about 5 to 30 percent chromium, up to about 30 percent cobalt, and the balance essentially up to about 90 percent iron and up to about 85 percent nickel.

18. The method according to claim 17, wherein the core metal is an alloy containing about 5 to 30 percent chromium, up to about 50 percent iron, and the balance essentially nickel.

19. The method according to claim 12, wherein the extrusion temperature is at least about 85 percent of the absolute melting point of the lowest melting phase of the material forming said shell and below the melting point of the core metal.

20. The method according to claim 13, wherein the extrusion temperature ranges from about 90 to 97 percent of the absolute melting point of the lowest melting phase of the material forming said shell.

21. A powder metallurgy method for producing a wrought composite metal tube having a cladding made of a high-chromium alloy which comprises, forming a composite billet by isostatically pressing a blended powder mixture containing about 40 to about 60 percent of chromium powder having a particle size ranging up to about 325 mesh with about 60 to about 40 percent of fine nickel powder having a particle size ranging up to about 10 microns to form a green pressed shell of uniform porosity having a tubular shape, inserting in said shell a substantially cylindrical core made of an alloy containing about 5 to about 30 percent chromium, up to about 50 percent iron, and the balance essentially nickel, sintering the resulting assembly at a temperature of about 1,800°F. to about 2,400°F. in an atmosphere nonoxidizing to the constituents of said shell, and then hot extruding the resulting assembly under protective conditions through an extrusion die to form a composite tube having an essentially dense cladding metallurgically bonded to the core material.

22. A powder metallurgy method for producing a wrought composite metal tube having a cladding made of a high-chromium alloy which comprises, forming a composite billet by isostatically pressing a blended powder mixture containing about 40 to about 60 percent of chromium powder having a particle size ranging up to about 325 mesh with about 60 to about 40 percent of fine nickel powder having a particle size ranging up to about 10 microns to form a green pressed shell of uniform porosity having a tubular shape, inserting in said shell a substantially cylindrical core made of steel, sintering the resulting assembly at a temperature of about 1,800°F. to about 2,400°F. in an atmosphere nonoxidizing to the constituents of said shell, and then hot extruding the resulting assembly under protective conditions through an extrusion die to form a composite tube having an essentially dense cladding metallurgically bonded to the core material.

* * * * *